United States Patent [19]

Vock et al.

[11] Patent Number: 4,482,658

[45] Date of Patent: Nov. 13, 1984

[54] PROCESS AND APPARATUS FOR PREPARING AQUEOUS DISPERSIONS OF SYNTHETIC RESINS

[75] Inventors: Friedrich Vock; Peter Lessmeister; Ralf Kirchner, all of Münster, Fed. Rep. of Germany

[73] Assignee: BASF Farben & Fasern AG, Hanover, Fed. Rep. of Germany

[21] Appl. No.: 449,986

[22] Filed: Dec. 15, 1982

Related U.S. Application Data

[63] Continuation of Ser. No. 304,008, Sep. 21, 1981, abandoned.

[30] Foreign Application Priority Data

Oct. 4, 1980 [DE] Fed. Rep. of Germany ....... 3037575

[51] Int. Cl.$^3$ ................................................. C08J 3/00
[52] U.S. Cl. .................................... 523/348; 523/332; 528/499; 528/502; 264/9
[58] Field of Search ................. 523/348, 332; 528/499, 528/502; 264/9

[56] References Cited

U.S. PATENT DOCUMENTS

| | | | |
|---|---|---|---|
| 2,831,840 | 4/1958 | Lindeboom | 528/502 |
| 2,854,426 | 9/1958 | Dosher | 528/502 |
| 2,977,351 | 3/1961 | Wiley | 528/502 |
| 3,090,774 | 5/1963 | Scoggin | 528/502 |
| 3,432,483 | 3/1969 | Peoples et al. | 528/499 |
| 3,544,540 | 11/1968 | Houser et al. | 528/502 |
| 3,862,103 | 1/1975 | Campbell et al. | 528/502 |
| 4,202,965 | 5/1980 | Shimizu et al. | 528/499 |

*Primary Examiner*—Joseph L. Schofer
*Assistant Examiner*—N. Sarofim
*Attorney, Agent, or Firm*—Wells & Wells

[57] ABSTRACT

A process and apparatus for the preparation of aqueous synthetic resin dispersions by using water to precipitate the synthetic resins from their solutions in water-miscible solvents. The solutions may contain pigments, extenders, and additives. The precipitated solids are separated off and dispersed uniformly in an aqueous medium. The precipitation of the synthetic resins is carried out in the presence of inert grinding bodies.

7 Claims, 2 Drawing Figures

PROCESS AND APPARATUS FOR PREPARING AQUEOUS DISPERSIONS OF SYNTHETIC RESINS

CROSS-REFERENCES TO RELATED APPLICATIONS

The present invention is a continuation of application Ser. No. 304,008, filed Sep. 21, 1981, now abandoned.

Applicants claim priority under 35 USC 119 for application No. P 30 37 575.8, filed Oct. 4, 1980, in West Germany. The priority document has been filed in application Ser. No. 304,008.

BACKGROUND OF THE INVENTION

The field of the invention is a process for preparing aqueous dispersions of synthetic resins and an apparatus for the production of these dispersions.

The invention is particularly concerned with the preparation of aqueous synthetic resin dispersions by precipitating the synthetic resins from their solutions in water miscible solvents with water. The solutions may also contain pigments, fillers, and additives and the precipitation is simultaneously mechanically stressed by milling means, the precipitated solids are subsequently separated and uniformly distributed in an aqueous medium.

The state of the art of such methods may be ascertained by reference to U.S. Pat. Nos. 2,831,840; 2,854,426; 2,977,351; 3,090,774; 3,432,483; 3,544,540; 3,862,103; and 4,202,965, the disclosures of which are incorporated herein.

With regard to synthetic resin systems used in coating processes, the particle size distribution of the solid ingredients affects greatly the property profile of many liquid system properties, for instance the stability of sedimentation, applicability, flow properties during film formation and the properties of the deposited and hardened films, for instance the color intensity and the gloss. Accordingly, specific distributions of particle sizes are required for specific products and applications, where these distributions should be below 10 microns for primer surfacers, motor vehicle primers and automobile top coats. The particle sizes of synthetic resins in aqueous synthetic resin dispersions should also be of the same order of magnitude as the particle sizes of the pigments for these fields of application. This is not achieved however when synthetic resin solutions in organic solvents are atomized with gases, superheated steam, air or natural gas. The atomized products then are dried and the solid, solvent-free synthetic resin particles so obtained are dispersed in water to form a synthetic resin dispersion. The required particle sizes and a uniform distribution of grain sizes again are not achieved when a synthetic resin solution in organic solvents is distributed in water in an agitator, whereby the solid is precipitated. Again no good results are obtained when a synthetic resin solution in organic solvents is blown by means of jet nozzles into water, the solid being precipitated in this manner.

SUMMARY OF THE INVENTION

Having in mind the limitations of the prior art it is an object of the present invention to prepare aqueous dispersions of synthetic resins wherein the solid synthetic resins evince particle sizes which after the preparation of a film result in a profile of properties similar to those obtained from solutions of synthetic resins.

This object is achieved according to the present invention by preparing aqueous synthetic resin dispersions by precipitating the synthetic resins with water from their solutions in water miscible solvents, which may also contain pigments, fillers and additives, while simultaneously mechanically stressing the dispersions with milling means, whereupon the precipitated solids are separated and uniformly distributed in an aqueous medium. The present invention is characterized in that the synthetic resins are precipitated in the presence of inert and moving milling means.

In a preferred embodiment of the invention, the synthetic resin solution is added with stirring to a vessel holding water and milling means, the precipitation of the solids taking place in particularly fine form due to the action of the milling means, the precipitate together with the liquid being separated from the milling means, the precipitate being filtered or centrifuged, and the filter cake or the centrifuged residue being dispersed into an aqueous medium.

Another embodiment of the invention provides continuous operation, using a continuously operating stirring mill. The stirring mill includes circulating water introduced directly before the intake of the stirring mill or else parallel with this intake into the synthetic resin solution. The precipitation takes place in the stirring mill within which remain the milling means while the precipitate together with the liquid is evacuated.

Substantial advantages follow from the use of milling means during the precipitation of the synthetic resins from their solutions in water miscible, organic solvents. Due to the intense stirring of the mixture of water and milling means or the mixture of milling means and synthetic resin solution, high shearing forces are applied. Upon mixing the synthetic resin solution into the water, the solvent diffuses at once from the synthetic resin solution into the water phase. While the organic solvent is diffusing into the aqueous phase, diffusion-inhibiting layers form on the boundary surfaces of the droplets. These layers are destroyed by the effect of the milling means and the precipitating particles of synthetic resin are distributed in a highly dispersed manner into the surrounding water phase with a very large surface of mass exchange being achieved. The quantitative ratio of water to synthetic resin solution is adjusted so that in this procedure the synthetic resin is present as a solid when the diffusion equilibrium is reached.

The advantages of the present invention using the milling means is that substantially finer particles of synthetic resins can be obtained and a very rapid precipitation procedure is possible. The suitable milling means are inert and may consist of various materials. They are, for example, balls made of steel or glass, further of steatite, porcelain, flint, or also they are sand, such as Ottawa sand, for use in the stirring mills.

BRIEF DESCRIPTION OF THE DRAWINGS

The present invention is explained in relation to the Figures of the drawings appended hereto, wherein.

DESCRIPTION OF THE PREFERRED EMBODIMENTS

Figure 1:
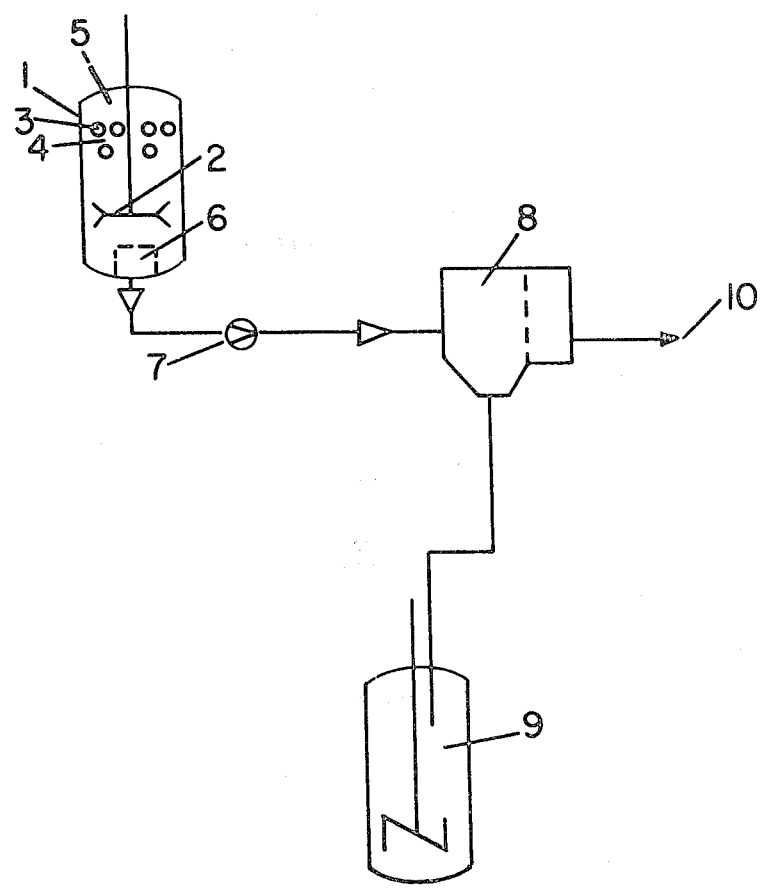
FIG. 1 is a schematic representation showing the present invention using a container filled with the milling means.

FIG. 1 shows an agitation vessel (1) provided with a stirrer (2) and containing milling means (3). Water (4) is present in the agitation vessel (1). The stirrer (2) is rotated about its vertical axis, whereby the milling means (3) and the water (4) are set into intensive motion. While there is vigorous agitation of the mixture of water and milling means by the stirrer (2), a synthetic resin solution (5) is supplied from above to the agitation vessel (1). Stirring proceeds for some time after the entire solution of the synthetic resin has been distributed through the vessel. Thereupon the liquid mixture is allowed to drain through a sieve (6) mounted at the bottom of the vessel (1) and retaining the milling means (3) within the vessel, the water containing the solvent being separated by a pump (7) and a filter (8) from the synthetic resin particles. The filter cake so produced in the filter (8) can be washed with further water. Thereupon the water humid filter cake is dispersed in a container (9) using water and possibly dispersants and protective colloids to form a synthetic resin dispersion.

The mixture of water and solvent is fed through (10) to a solvent reprocessing apparatus.

It is also possible to use a centrifuge instead of the filter (8), in which case the centrifuge residue will be reprocessed in the same manner as the filter cake.

Figure 2:
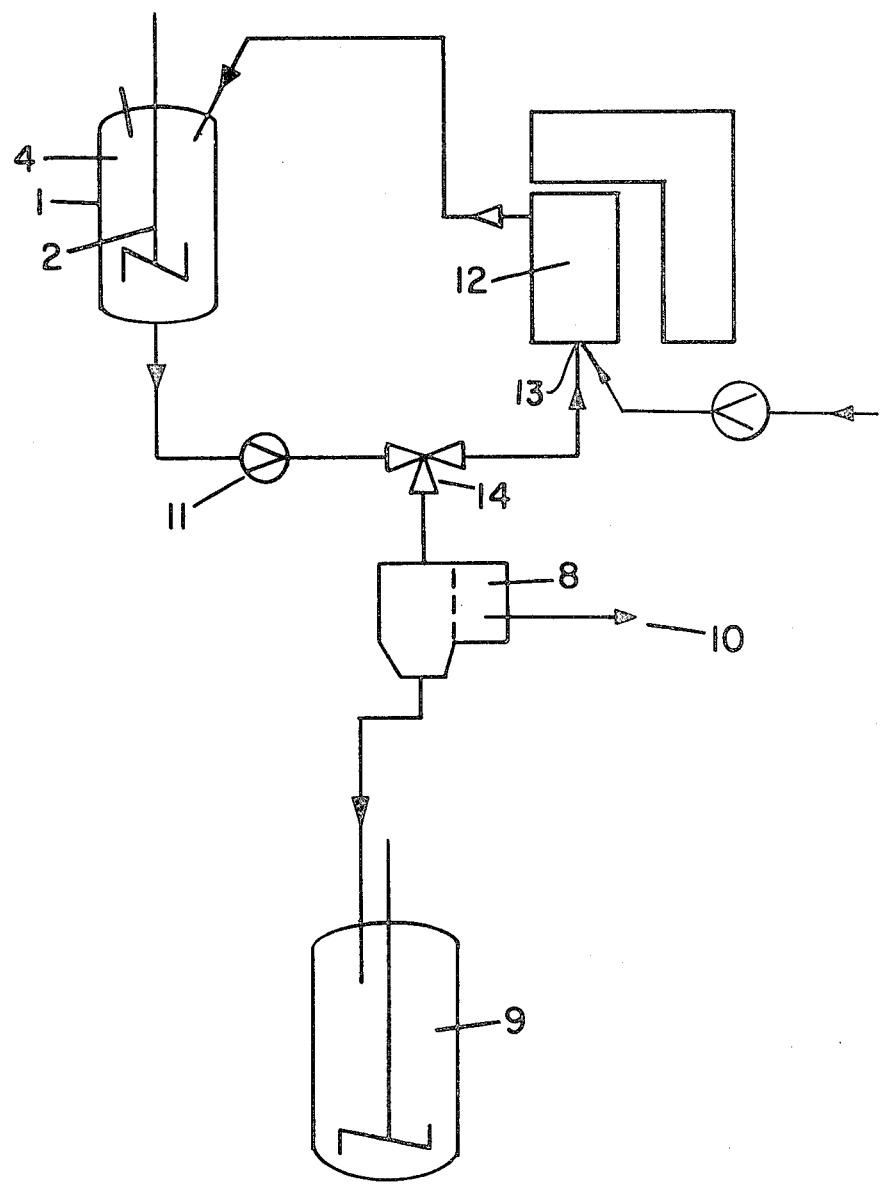
FIG. 2 is a schematic representation showing the present invention using a stirring mill operating continuously.

As shown by the procedure of FIG. 2, water (4) is placed in an agitator vessel (1) provided with a stirrer (2), said water being pumped by a pump (11) through a stirring mill (12) filled with milling means and then being fed back into the vessel (1). A solution of synthetic resin is metered at (13) into the above circulation. Following the termination of the dispersion and the precipitation of the synthetic resin, the liquid mixture is supplied from the agitation vessel (1) through a three-way valve (14) to the filter or to the centrifuge (8). The filter cake, or centrifuge residue, thereupon is dispersed with water into a synthetic resin dispersion.

The aqueous dispersions prepared in this manner contain synthetic resin particles of minute size which are very finely distributed and which upon deposition on a substrate and hardening are indistinguishable in their technical properties from coatings made from a synthetic resin solution.

Specific examples of embodiments for carrying out the invention follow:

EXAMPLE 1

A solution is prepared from:
24 parts of diacetone alcohol,
60 parts of an epoxy resin powder made of bisphenol A and epichlorohydrin, with a melting point range (Kolfler) of 70°-75° C.
1 part of a flow agent such as MODAFLOW (R) as supplied by Monsanto Co., St. Louis, MO 63116 and
15 parts of acetone.
43 parts of this solution are dispersed with:
16 parts of (rutile type) titanium dioxide,
2 parts of iron oxide black,
21 parts of barium sulfate,
18 parts of acetone, and an addition of
0.2 part of a flow agent such as MODAFLOW (R) in a ball mill to form a fine particulate dispersion (Hegmann granularity: 5 to 10 microns).
34 parts of this dispersion are combined with:
15 parts of a solution of 70 parts of an acid polyester resin (acid number 90), and 30 parts of acetone
to form a precipitation pre-product with about 70% solids by weight.

The precipitation was carried out according to the apparatus of FIG. 1 in a cooled agitated vessel holding 12 liters (of about 20 cm diameter) and provided with a paddle mixer rotating at 650 rpm.

10 kg of glass milling balls (1.5 mm diameter) and water were placed in the agitation vessel. The amounts of enamel and water were so chosen that after adding the above amount of dispersion, the ratio of lacquer to water was set at 1:7.

The temperature was kept at 30° C. during the precipitation procedure.

The suspension so obtained was separated from the milling means using a sieve in front of the bottom valve of the agitation vessel. After the suspension was centrifuged, a centrifuged cake with a water content of 55% and a solvent content of less than 2% was obtained.

The grain size was determined by microscopic measurement and found to be about 5 microns.

Next the processing viscosity was adjusted by adding about 15% of water, and a film was applied on a metal panel using a flow-cup gun and thereupon baked at 185° C. for 20 minutes, evincing good optical and weather-industrial properties.

EXAMPLE 2

An enamel according to Example 1, for which the proportion of diacetone alcohol is replaced by acetone, is precipitated in an apparatus according to FIG. 1 using steatite as the milling means, the temperature being 20° C. and the other conditions the same as in Example 1.

Following washing and centrifuging, a centrifuged cake having 50% content of water and less than 1% of solvent is obtained.

The microscopically ascertained grain size was about 20 microns.

The spray viscosity is adjusted by adding about 20% water and the substance is applied by a flow-cup gun, whereupon it is baked (20 minutes at 185°C.), resulting in a film with good optical and weather-industrial properties.

EXAMPLE 3

An enamel with a Hegmann granular fineness of less than 5 microns was prepared in a stirring mill from:
9.2 parts of (rutile type) titanium dioxide,
3.8 parts of a silicate filler,
0.6 part of a flow agent according to Example 1,
0.3 part of a catalyst in the form of dibutyltinoxide,
63.3 parts of an epoxy resin powder consisting of bisphenol A and epichlorohydrin with a Kofler melting-point range of 70-75° C., and
22.8 parts of an isophoronediisocyanate blocked with epsilon-caprolactam.

In the apparatus shown in FIG. 2, an agitated mill contains glass milling means of 1.5 mm diameter filling the 4-liter capacity to 75% and is crossed by a circulation of water with a rate of 100 liter/h; the enamel is supplied at about 30 liter/h by a pump to the circulating water at the intake of this agitated vessel. The quantitative ratios are so selected that after precipitation, the ratio of enamel to water is 1:5.

After the precipitation, the suspension so obtained is centrifuged to a water content of about 50% and to less than 1% of organic solvent.

The spray viscosity is set by adding about 25% of water, and this substance is applied by a flow-cup gun; after baking at 15 minutes and 190° C., a film with good optical and weather-industrial properties is obtained.

What we claim is:

1. In a process for preparing aqueous dispersions of synthetic resins by: (a) precipitating the synthetic resins with water from their solutions in water-miscible solvents while simultaneously subjecting them to mechanical stresses using, milling means; (b) separating precipitated solids; and (c) simultaneously with step (b) distributing said precipitated solids in an aqueous medium; the improvement comprising:

carrying out step (a) in the presence of inert and moving milling means comprising glass milling balls.

2. The process of claim 1 wherein said solutions of step (a) contain pigments, fillers and additives.

3. The process of claim 2 wherein said synthetic resin solutions are added in step (a) with stirring to a vessel containing water and milling means, the solid precipitating in finely distributed manner, whereafter the precipitate is separated in step (b) with filtering and filter cake is dispersed into an aqueous medium in step (c).

4. The process of claim 2 wherein said synthetic resin solutions are added in step (a) with stirring to a vessel containing water and milling means, the solid precipitating in finely distributed manner, whereafter the precipitate is separated in step (b) by centrifuging and the centrifuging residue is dispersed into an aqueous medium in step (c).

5. The process of claim 2 wherein said synthetic resin solutions are metered to a stirring mill filled with milling means, through said mill being led continuously a water circuit, said synthetic resin solutions are fed into said water circuit directly where this circuit enters said stirring mill.

6. The process of claim 2 wherein a suspension produced by the precipitation in step (a) is separated from the milling means by means of a sieve at the discharge of the vessel.

7. The process of claim 6 wherein said separation of the suspension produced by precipitation from the milling means is performed by a centrifuge.

* * * * *